March 16, 1943.                I. W. DILLON                2,314,199
                     GAUGE FOR INTERNAL SCREW THREADS
                            Filed July 3, 1941
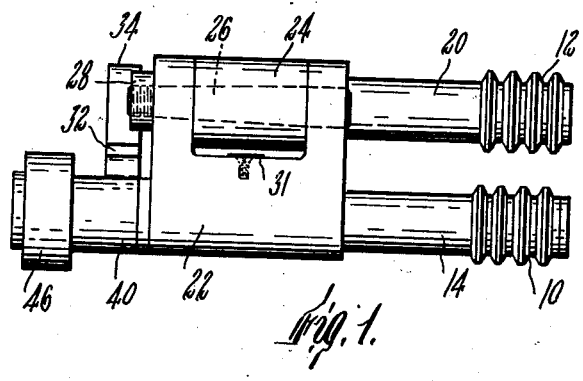
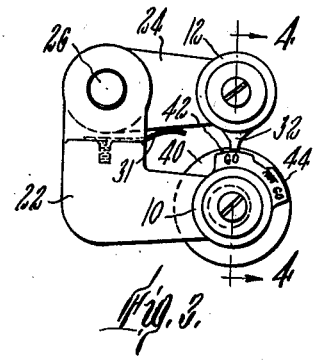
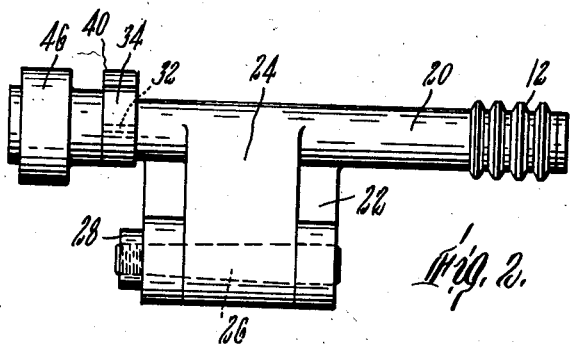
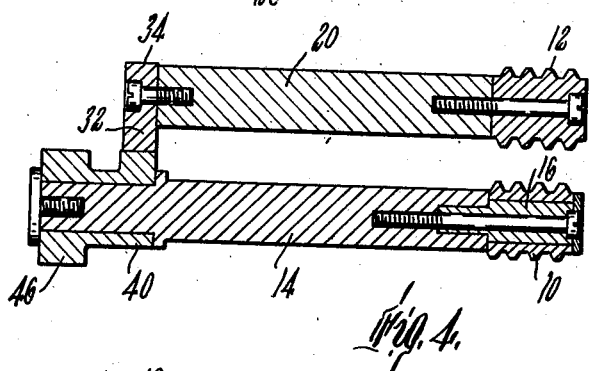
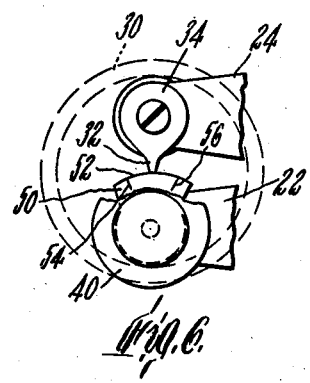
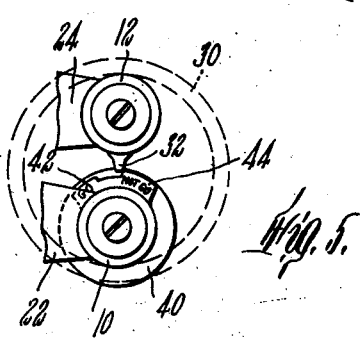
Inventor
Irving W. Dillon
by Wright, Brown, Quinby & May
                Attys.

Patented Mar. 16, 1943

2,314,199

UNITED STATES PATENT OFFICE 2,314,199

GAUGE FOR INTERNAL SCREW THREADS

Irving W. Dillon, Melrose, Mass.

Application July 3, 1941, Serial No. 400,923

4 Claims. (Cl. 33—199)

This invention relates to gauges for internal screw threads, and more particularly to the "go, not go" type of gauge. It is an object of the invention to provide a gauge which is rapid and accurate in operation, and by which the accuracy of the screw thread within prescribed limits of tolerance can readily be determined by the sense of touch without the necessity of reading marks on a gauge.

According to the invention, a pair of gauging members such as rolls or cylinders having peripheral ridges and grooves are connected by hinge means or the like so as to be movable toward and from each other while maintaining mutual parallelism. The gauging members may conveniently be carried on the ends of a pair of parallel shafts by which the elements may be inserted into a threaded aperture to be gauged, leaving the hinge means outside of the aperture for convenient manipulations. The gauging elements must be moved to each other to permit their insertion into a threaded aperture to be gauged. Then they are moved apart to seat in the thread, this involving also a corresponding separating movement on the part of the two shafts. Detecting elements are then moved into abutting engagement on a line from one shaft axis to the other if the shaft axes are sufficiently spaced apart to permit such movement, this incidentally having the effect of blocking reverse movement of the gauging elements toward each other.

For a more complete understanding of the invention, reference may be made to the following description thereof, and to the drawing of which Figure 1 is a side elevation of a gauge embodying the invention.

Figure 2 is a plan view of the same.

Figure 3 is an end elevation of the same as seen from the right in Figure 1.

Figure 4 is a section on the line 4—4 of Figure 3.

Figure 5 is similar to a portion of Figure 4, the parts being shown in different positions.

Figure 6 is a fragmentary view of a modified form of the invention.

The gauge comprises a pair of gauging members 10 and 12 which are preferably in the form of cylinders having peripheral ridges and grooves adapted to seat in the thread of a threaded aperture. The member 10 is mounted on the end of a suitable shaft 14 by means of a hub member 16 which is eccentric to the axis of the shaft 14 so as to permit fine adjustment of the gauging member 10 toward or from the member 12. The member 12 is mounted on the end of a suitable shaft 20, these shafts being maintained in mutually parallel relation and the gauging members being preferably rotatable thereon so as to distribute the wear on the gauging surfaces.

The shafts 14 and 20 are connected together by suitable means which maintains the shafts in their parallel relation but permits relative movement toward and from each other. For example, a simple hinge device is shown as connecting means between the shafts, this hinge consisting of one member 22 which is fixed to or integral with the shaft 14, the other member 24 being integral with or fixed to the shaft 20. These hinge members are held together in mutually rockable relation by a suitable hinge pin 26. As shown in Figure 1, this hinge pin may be slightly tapered and fitted into a tapered hole in the member 24, a nut 28 being on the projecting threaded end portion of the pin to maintain the pin firmly in position. By setting up on the nut 28, the pin may be drawn further through its hole to take up any wear or slack between the pin 26 and its holder. The hinge member 22 is preferably but not necessarily L shaped in section, as indicated in Figure 3, for convenience in handling. The hinge connections permit relative movement of the shafts 14 and 20 toward and from each other, this resulting in similar relative movement of the gauging members 10 and 12 toward and from each other. In using the gauge, the gauging members 10 and 12 are moved close to each other to permit their insertion into the aperture of an internally threaded piece of work 30 to be tested. The shafts 14 and 20 facilitate the insertion of the gauging members into the work, the hinge connecting means between the shafts remaining outside of the aperture for convenient manipulation. When the gauging members 10 and 12 have entered the aperture of the work, they are moved away from each other until they become firmly seated in the thread to be tested. A suitable spring 31 may be employed to press the gauge members apart. The distance between the axes of the shafts 14 and 20 when the gauging members are properly seated indicates whether the diameter of the thread under test is accurate or within prescribed limits of tolerance.

Detecting mechanism is provided, according to the invention, to indicate by the "go, not go" method whether the thread under test comes within prescribed limits of tolerance. As shown, such mechanism comprises elements which are movable into position between the axes of the shafts so as to be in abutting relationship along a line from one axis to the other, this incidentally resulting in the blocking of the shafts against reverse movement toward each other while the detecting elements are in position. By way of example, the shaft 20 is provided with a radial projection 32 extending toward the axis of the shaft 14. The projection 32 may conveniently be a portion of a disk 34 secured to the end of the shaft 20 remote from the gauging member 12. Cooperating with the projection 32 is a member 40 rotatably mounted on the end portion of the shaft 14 remote from the gauging member 10. This member 40 has a pair of radially projecting elements 42 and 44 on its periphery, these elements being with the projection 32 in a common plane perpendicular to the axes of the shafts. A finger knob 46 is formed on or secured to the member 40 to facilitate manual rotation thereof. The projection 42 and the projection 44 have outer surfaces which are cylindrical in shape and are coaxial with the shaft 14, the radius of the outer surface of the projection 44 being slightly greater than that of the projection 42. When the gauge is in use and the gauging members 10 and 12 are properly seated in an internal thread to be tested, the finger knob 46 is manipulated to rotate the detecting member 40 so as to bring the projection 42 into line with the cooperating projection 32 as indicated in Figure 3. If the projection 42 cannot be moved into alinement with the projection 32 on account of insufficient spacing between the axes of the shafts 14 and 20, that is an indication that the diameter of the threaded aperture is too small to be acceptable. If, however, the projection 42 can move into alinement with the projection 32 as indicated in Figure 3, that shows that the diameter of the thread under test is greater than the minimum limit of tolerance. The member 40 is then turned further to bring the projection 44 into alinement of the projection 32 if possible. If the diameter of the thread under test is within the maximum limit of tolerance, the projection 44 will not be able to move into alinement with the projection 32 but will engage it laterally as indicated in Figure 5. Unless the projection 44 is thus stopped by the projection 32, it is evident that the diameter of the thread under test exceeds the maximum limit of tolerance. Thus by the use of this gauge, the acceptable pieces of work which have internal screw threads within the maximum and minimum limits of tolerance can be quickly detected by rotation of the member 40 without having to examine any scale marks on the gauge since it is easy to tell by the sense of touch when the detecting member 40 has been turned sufficiently for the projection 42 to pass the projections 32 and for the projection 44 to be stopped by contact against the projection 32.

A modified form of detecting means is illustrated in Figure 6. In this form of the invention a single projection 50 on the detecting member 40 is employed in place of the two projections 42 and 44. The outer surface 52 of the projection 50 instead of being cylindrical is part of a spiral so that it acts as a cam surface against the projection 32. On the projection 50 are preferably a pair of suitable scale marks 54 and 56 to indicate the limits of tolerance within which the projection 32 should come into binding engagement with the surface 52. While this form of detecting means requires inspection to determine whether the work is acceptable or not, it has the advantage of indicating any tendency on the part of the work to approach either of the limits of tolerance so that it is sometimes possible to make suitable adjustments on the thread-cutting machine before the machine has reached the point of turning out defective work which must be rejected.

It is evident that various modifications and changes may be made in the embodiments of the invention herein shown and described without departing from the spirit or scope thereof as defined in the following claims.

What I claim is:

1. A gauge for internal screw threads, comprising a pair of parallel shafts having end portions insertable into a threaded aperture to be gauged, a pair of gauging members on said respective end portions, hinge means connecting said shafts to permit relative lateral motion thereof and to maintain said shafts in mutually parallel relationship, and means of predetermined length movable into position between the axes of said shafts to define the correct gauging distance between said axes.

2. A gauge for internal screw threads, comprising a pair of gauging members insertable into a threaded aperture to be tested and movable away from each other into engagement with the thread in said aperture, hinge means connecting said members and guiding their relative movements, and a detecting member mounted on said connecting means, said detecting member being movable when the gauging members are in gauging contact with a standard thread to block reverse movement of said gauging members toward each other.

3. A gauge for internal screw threads, comprising a hinge with two relatively rockable members, a gauging element carried by each said member and movable away from each other into engagement with a screw thread to be tested, detecting elements carried by said members and arranged to be in mutually abutting contact when said gauging elements are in contact with a standard internal thread to prevent reverse movement of said gauging elements toward each other.

4. A gauge for internal screw threads, comprising a pair of parallel shafts, gauging elements on the ends of said shafts, hinge means connecting said shafts and permitting relative movement of said gauging elements toward and from each other, a detecting element fixed on one said shaft and projecting toward the other shaft, a cooperating detecting element rotatively mounted on the other said shaft, said cooperating detecting element having two radial projections movable by rotation of said cooperating element to move said projections successively into alinement with the fixed detecting element on a line extending from one shaft axis to the other when the gauging elements are sufficiently spaced apart to permit such alinement, said fixed detecting element being alineable with only one of said projections when the gauging elements are seated in a thread having a diameter within prescribed limits of tolerance and being alineable with both or neither of said projections when the gauging elements are seated in a thread having a diameter beyond the limits of tolerance.

IRVING W. DILLON.